US011111047B2

(12) United States Patent
Squires et al.

(10) Patent No.: US 11,111,047 B2
(45) Date of Patent: Sep. 7, 2021

(54) PACKAGING MACHINERY HAVING AUTOMATED ADJUSTMENTS BASED ON PACKAGE PARAMETERS

(71) Applicant: Schneider Packaging Equipment Co., Inc., Brewerton, NY (US)

(72) Inventors: Peter Squires, Central Square, NY (US); Vincent Guarneiri, Verona, NY (US)

(73) Assignee: Schneider Packaging Equipment Co., Inc., Brewerton, NY (US)

(*) Notice: Subject to any disclaimer, the term of this patent is extended or adjusted under 35 U.S.C. 154(b) by 104 days.

(21) Appl. No.: 15/804,830

(22) Filed: Nov. 6, 2017

(65) Prior Publication Data

US 2018/0127135 A1 May 10, 2018

Related U.S. Application Data

(60) Provisional application No. 62/418,229, filed on Nov. 6, 2016.

(51) Int. Cl.
*B65B 59/02* (2006.01)
*B65B 57/08* (2006.01)
*B65B 35/26* (2006.01)
*B65B 35/56* (2006.01)
*G06F 16/245* (2019.01)
*B65B 7/20* (2006.01)
*B65B 59/00* (2006.01)

(52) U.S. Cl.
CPC .............. *B65B 59/02* (2013.01); *B65B 35/26* (2013.01); *B65B 35/56* (2013.01); *B65B 57/08* (2013.01); *G06F 16/245* (2019.01); *B65B 7/20* (2013.01); *B65B 59/003* (2019.05); *B65B 2210/04* (2013.01)

(58) Field of Classification Search
CPC ......... B65B 59/02; B65B 35/26; B65B 35/56; B65B 57/08; B65B 2210/04; B65B 7/20; G06F 16/245; G06F 17/30424
USPC ............ 53/476, 484, 52, 64, 69, 285, 376.3, 53/376.4, 377.6
See application file for complete search history.

(56) References Cited

U.S. PATENT DOCUMENTS

| 5,115,625 A | * | 5/1992 | Barbulesco | ............... B65B 7/20 |
| | | | | 53/467 |
| 5,638,659 A | * | 6/1997 | Moncrief | ................ B65B 59/02 |
| | | | | 53/448 |
| 5,687,543 A | * | 11/1997 | Shing-Tak Lam | .... B65B 51/067 |
| | | | | 53/136.4 |

(Continued)

*Primary Examiner* — Chelsea E Stinson
*Assistant Examiner* — Himchan Song
(74) *Attorney, Agent, or Firm* — Bond Schoeneck & King, PLLC; George McGuire

(57) ABSTRACT

A packaging machine having at least a pair of independently driven conveyors on which packages are adapted to be carried though the machine for processing, a micro-controller having a memory in which is stored a computer program containing computer readable instructions, a database/look-up table containing data correlating package sizing parameters with optimal speed profiles at which the machine can run effectively, at least one motor that drives each conveyor, and a motor controller that is electronically linked to the micro-controller for purposes of adjusting the speed at which the motor runs based upon the speed profile of the package.

3 Claims, 9 Drawing Sheets

(56) References Cited

U.S. PATENT DOCUMENTS

| | | | | |
|---|---|---|---|---|
| 8,464,864 | B2* | 6/2013 | Bell | B65G 21/2072 |
| | | | | 198/836.3 |
| 2002/0088206 | A1* | 7/2002 | Gendre | B65B 43/265 |
| | | | | 53/456 |
| 2004/0123559 | A1* | 7/2004 | Le | B65B 51/067 |
| | | | | 53/136.4 |
| 2004/0226268 | A1* | 11/2004 | Vinh Le | B65B 59/003 |
| | | | | 53/491 |
| 2005/0126123 | A1* | 6/2005 | Chase | B65B 7/20 |
| | | | | 53/415 |
| 2009/0094946 | A1* | 4/2009 | Trinko | G01N 21/89 |
| | | | | 53/456 |
| 2011/0041464 | A1* | 2/2011 | Park | B65B 57/02 |
| | | | | 53/476 |
| 2015/0291295 | A1* | 10/2015 | Langen | B65B 43/52 |
| | | | | 53/467 |
| 2015/0360433 | A1* | 12/2015 | Feijen | B31B 50/74 |
| | | | | 53/456 |
| 2016/0185065 | A1* | 6/2016 | Sytema | B31B 50/52 |
| | | | | 493/180 |
| 2016/0304226 | A1* | 10/2016 | Rossini | B29C 65/7882 |
| 2017/0247129 | A1* | 8/2017 | Menta | B65B 57/04 |

* cited by examiner

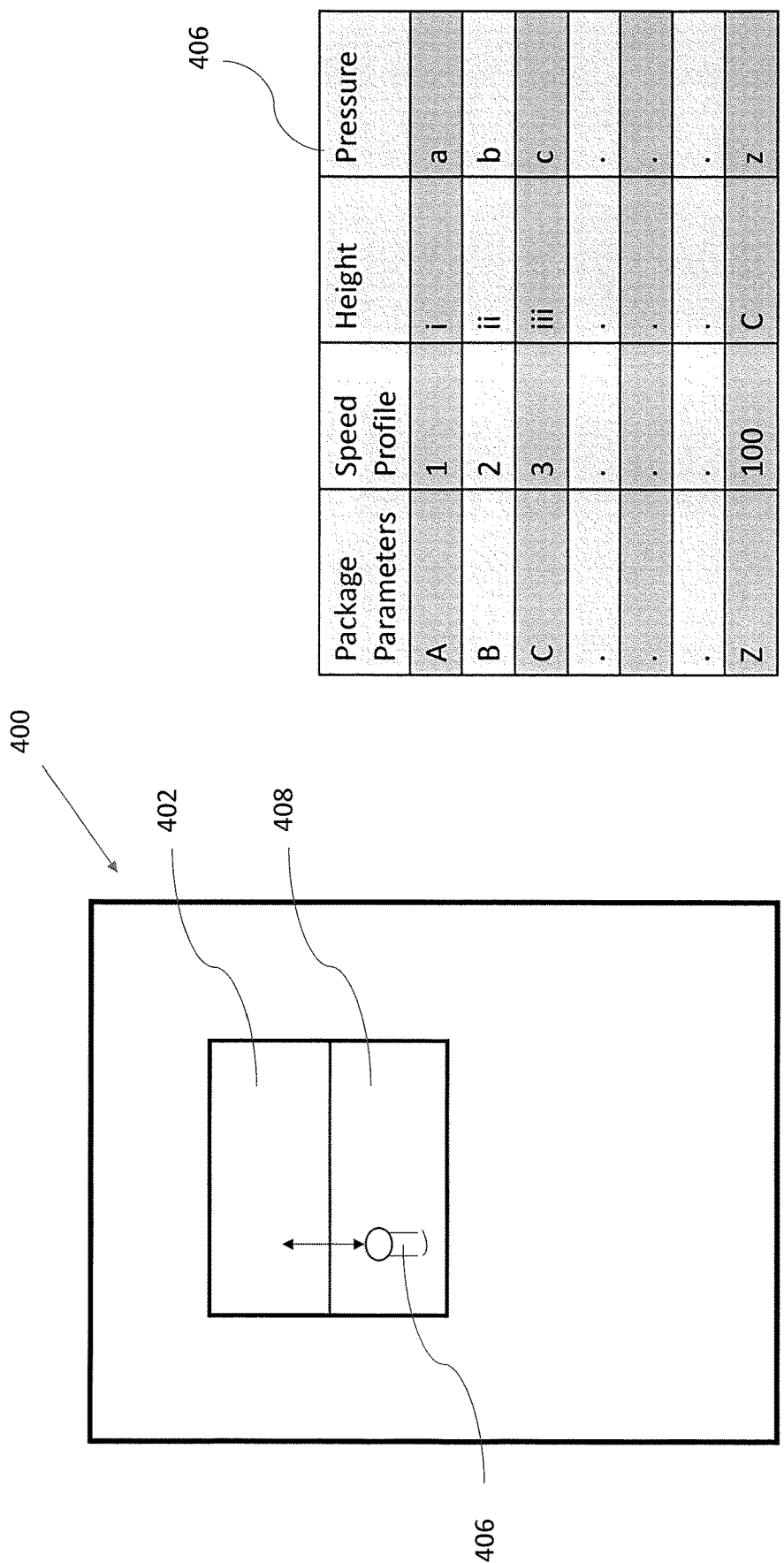

PACKAGING MACHINERY HAVING AUTOMATED ADJUSTMENTS BASED ON PACKAGE PARAMETERS

REFERENCE TO RELATED APPLICATION

The present application relates and claims priority to Applicant's U.S. Provisional Patent Application Ser. No. 62/418,229, filed Nov. 6, 2016, the entirety of which is hereby incorporated by reference.

BACKGROUND

1. Field of Invention

The present invention relates generally to packaging machines, and more particularly to packaging machines having automated adjustable profiles for purposes of automating the processing of packages having different parameters at optimal speeds.

2. Background of Art

Packaging machines operate on a motor-driven conveyor belt type system to close and seal boxes typically containing multiple units of a certain product for subsequent shipping to the product's retail or end user destination. Due to differences in the size and weight of the packages the motor driving the conveyor along which the box is moved through the packaging process must be adjusted to ensure proper closing and sealing of the boxes. When packages having different parameters are processed on the same machine and at the same time, the operator of the machine must manually alter the speed profile of the machine to adjust for the differences in the package's sizing parameters. Alternatively, the machine is simply preset to run at the slowest speed necessary to accommodate all the packaging being processed in a given run, thus unnecessarily slowing the process and achieving less than optimal output on a time basis for that machine. In addition, height and pressure settings for the flap and seal mechanisms and centering systems need to be manually changed based on differences in package parameters or a less than optimal setting is preset that accommodates all packages during a given run.

3. Objects and Advantages

It is therefore a principal object and advantage of the present invention to provide a packaging machine that automatically adjusts the machine's speed profile based upon each package's unique sizing parameters.

It is a further object and advantage of the present invention to provide a packaging machine that automatically adjusts the height or the flap and sealing mechanisms based on a package's unique parameters.

It is another object and advantage of the present invention to provide a packaging machine that automatically adjusts the level of pressure applied to a package when centering on the machine and holding during the flap folding operation.

Other objects and advantages of the present invention will in part be obvious from the foregoing disclosure and in part appear hereinafter.

SUMMARY OF THE INVENTION

In accordance with the foregoing objects and advantages, the present invention provides in one embodiment a packaging machine having at least a pair of independently driven conveyors on which packages are adapted to be carried though the machine for processing, a micro-controller having a memory in which is stored a computer program containing computer readable instructions, a database/look-up table containing data correlating package sizing parameters with optimal speed profiles at which the machine can run effectively, at least one motor that drives each conveyor, and a motor controller that is electronically linked to the micro-controller for purposes of adjusting the speed at which the motor runs based upon the speed profile of the package.

In one aspect of the invention, the packaging machine further comprises tucking and sealing heads that fold closed flaps on the packages and then seal the flaps with tape or other adhesive, and the database/look-up table further contains data correlating the optimal height dimensions for the tucking and sealing heads based on the package sizing parameters. The tucking and sealing heads receive a signal from the micro-controller such that they adjust their respective heights to the amount level.

In another aspect of the invention, the packaging machine further comprises a case centering system that grips the sides of the packages for purposes of centering them for the tucking and sealing heads, and the database/look-up table contains data correlating the optical pressure settings to be applied to each package based upon its sizing parameters. The case centering system receives a signal from the micro-controller such that its grippers apply the optimal amount of pressure to the sides of the package.

BRIEF DESCRIPTION OF THE DRAWINGS

The present invention will be more fully understood and appreciated by reading the following Detailed Description in conjunction with the accompanying drawings, in which:

FIG. 9a is a block diagram of a control center; and

FIG. 9b is an illustrative diagram of a look-up table.

DETAILED DESCRIPTION

Figure 1:
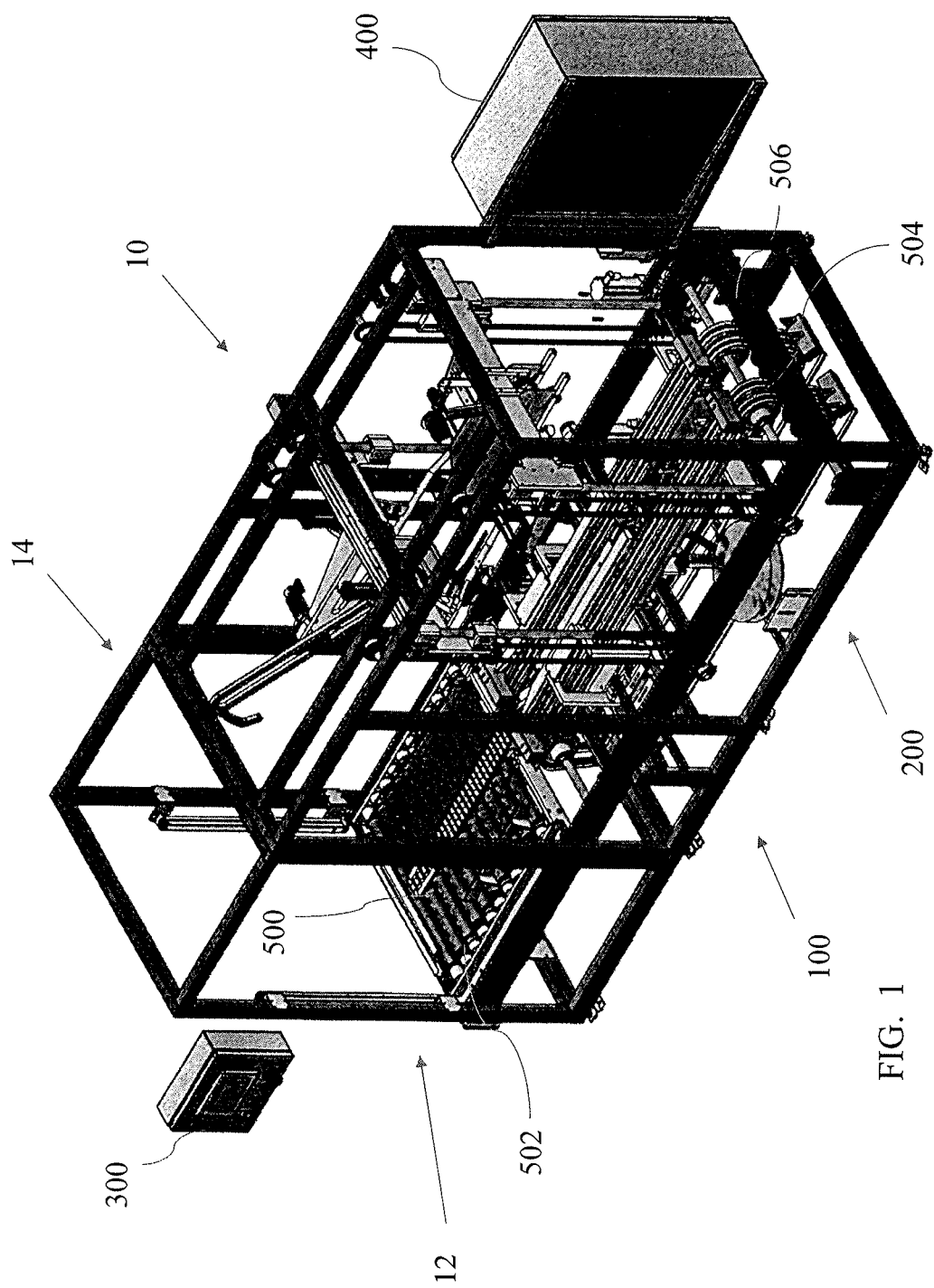
FIG. 1 is a perspective view of a packaging machine in accordance with an embodiment of the present invention.
Figure 2:
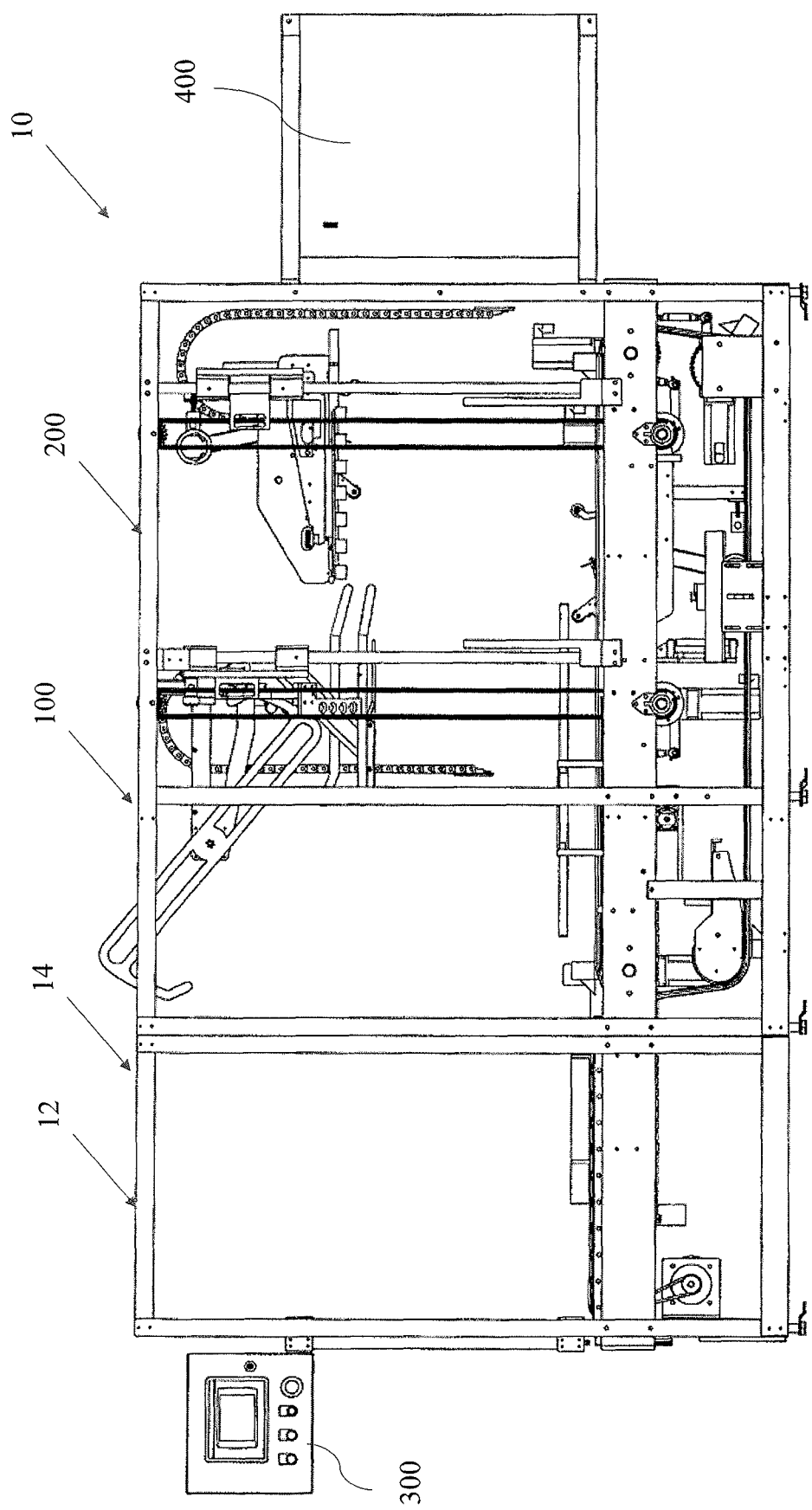
FIG. 2 is a side elevation view thereof.
Figure 3:
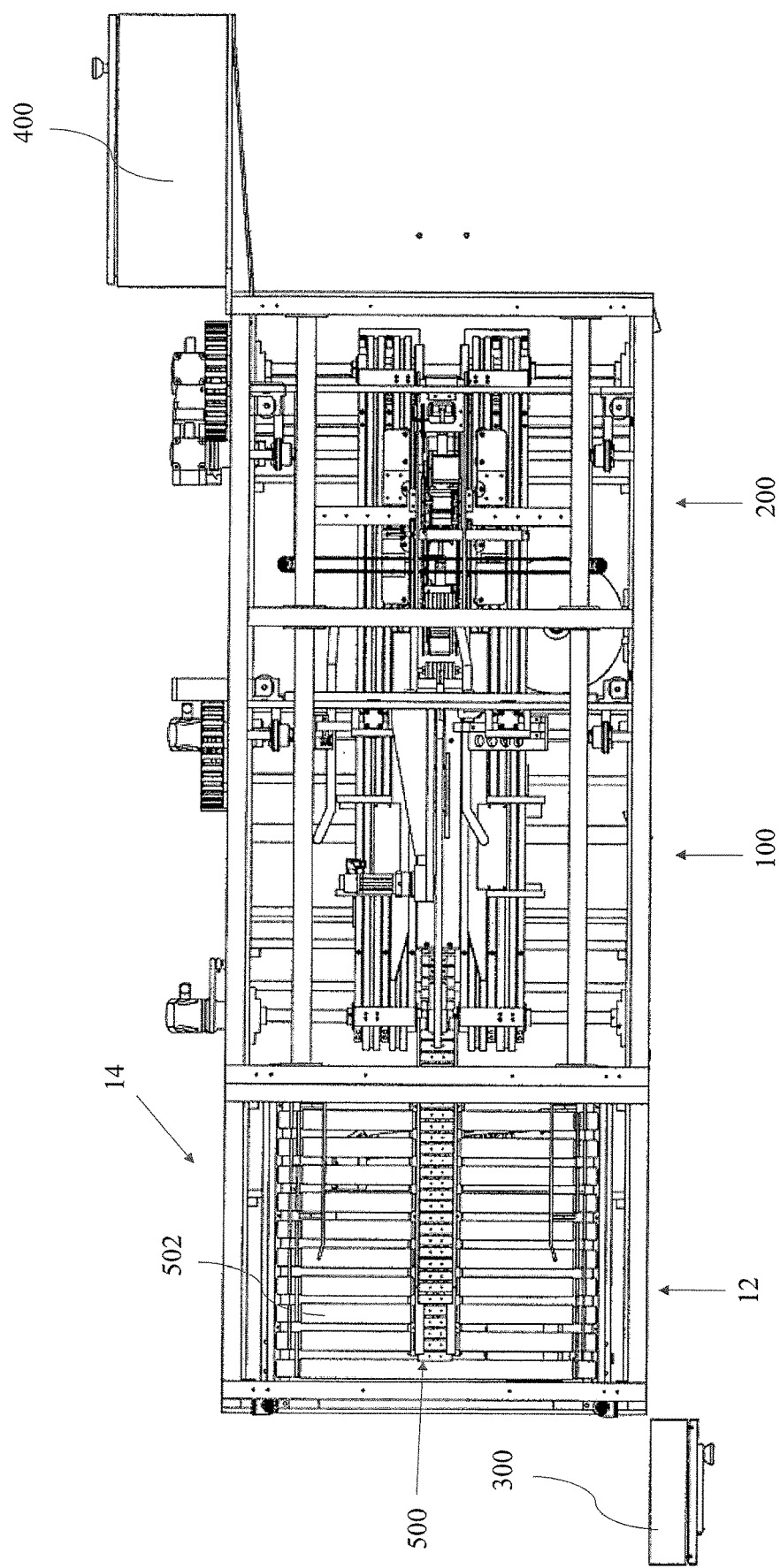
FIG. 3 is a top plan view thereof.
Figure 4:
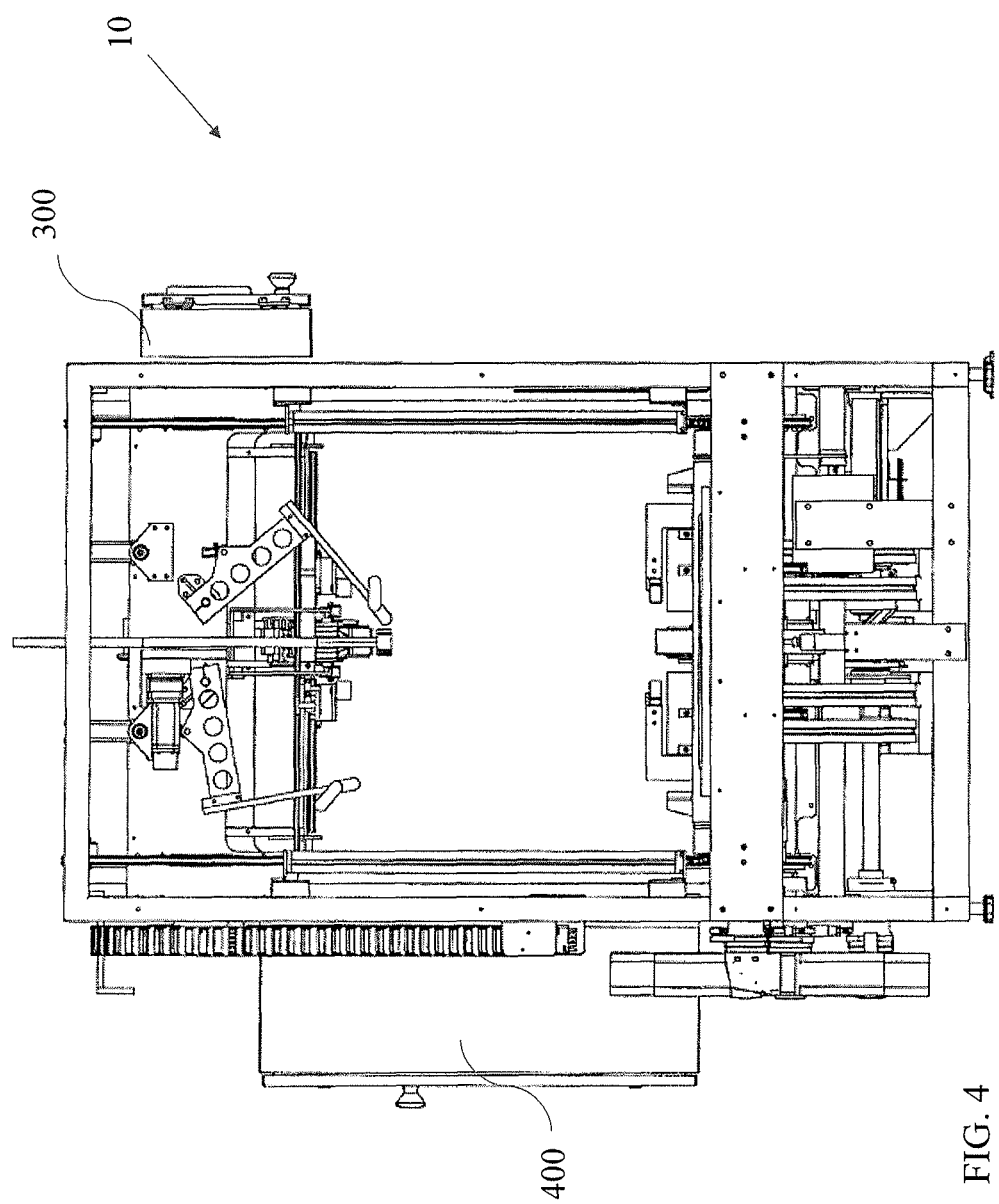
FIG. 4 is an operator end elevation view thereof.
Figure 5:
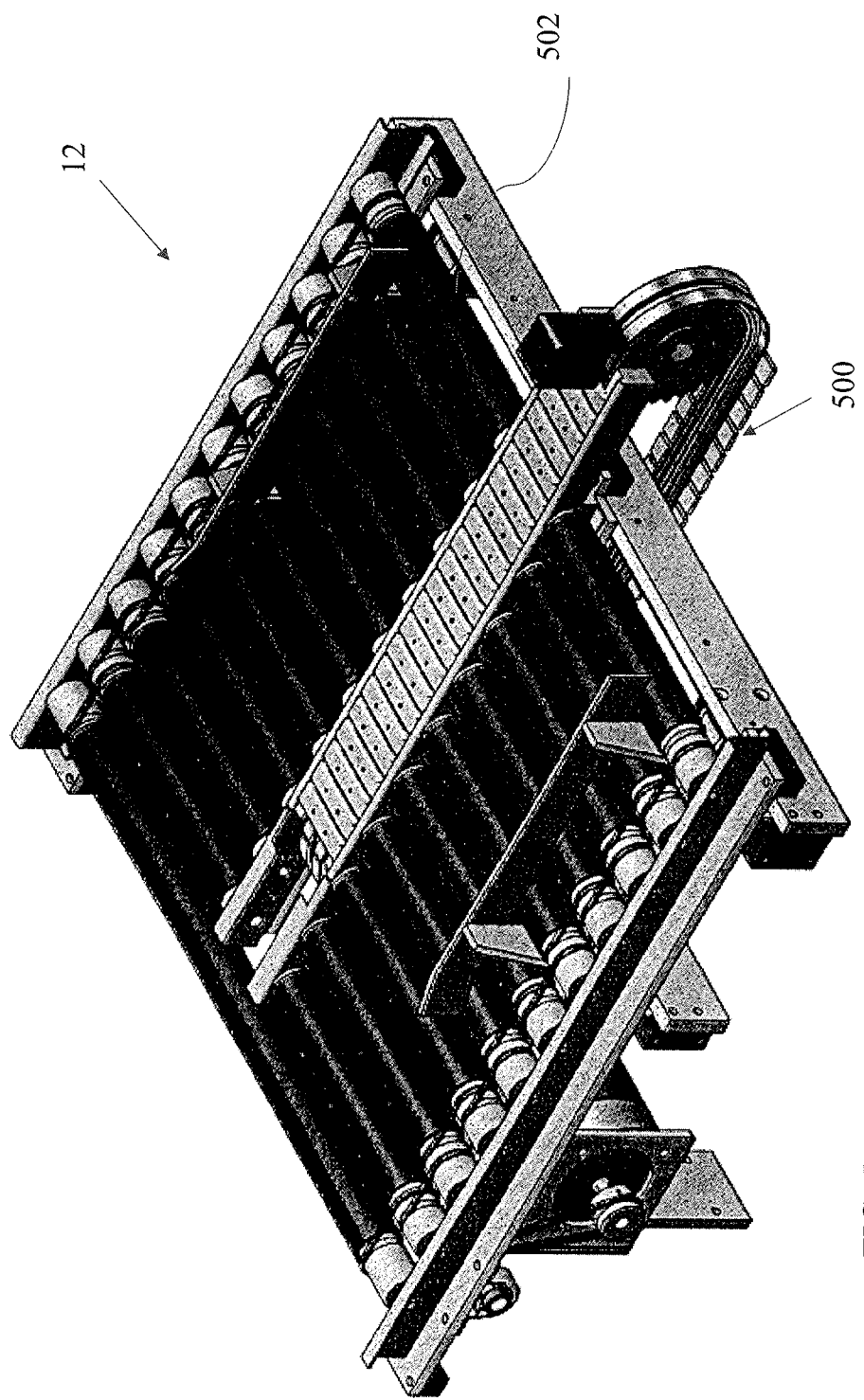
FIG. 5 is a perspective view of an infeed centering and measuring section.
Figure 6:
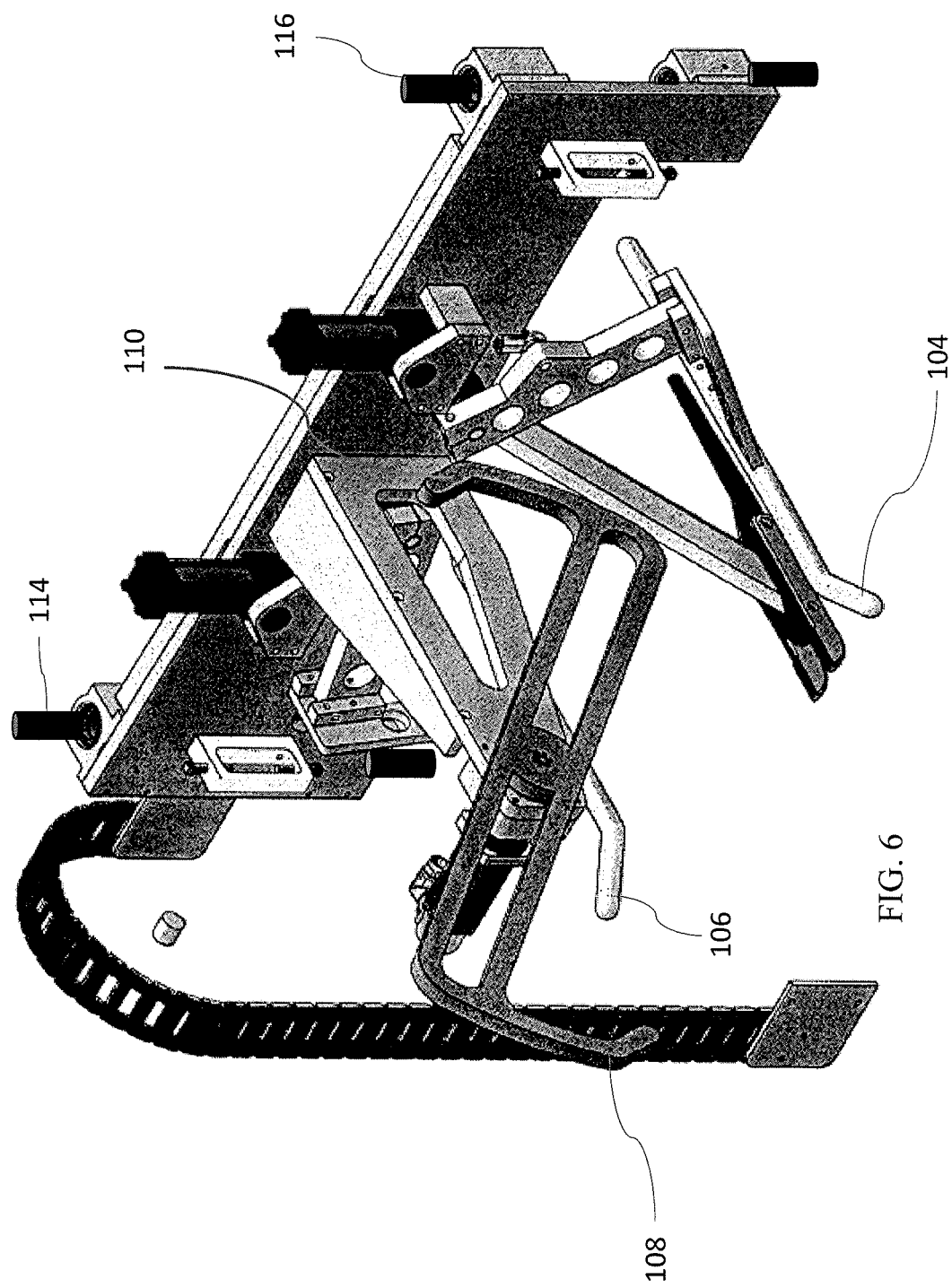
FIG. 6 is a perspective view of a tuck-and-folding mechanism.
Figure 7B:
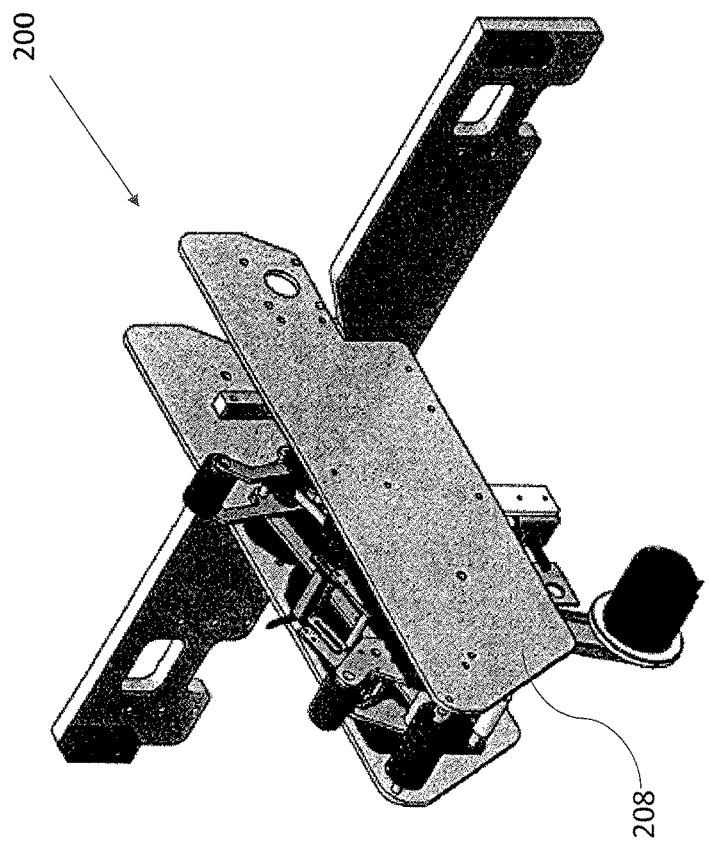
FIGS. 7a and 7b are perspective views of top and bottom sealing devices, respectively.
Figure 7A:
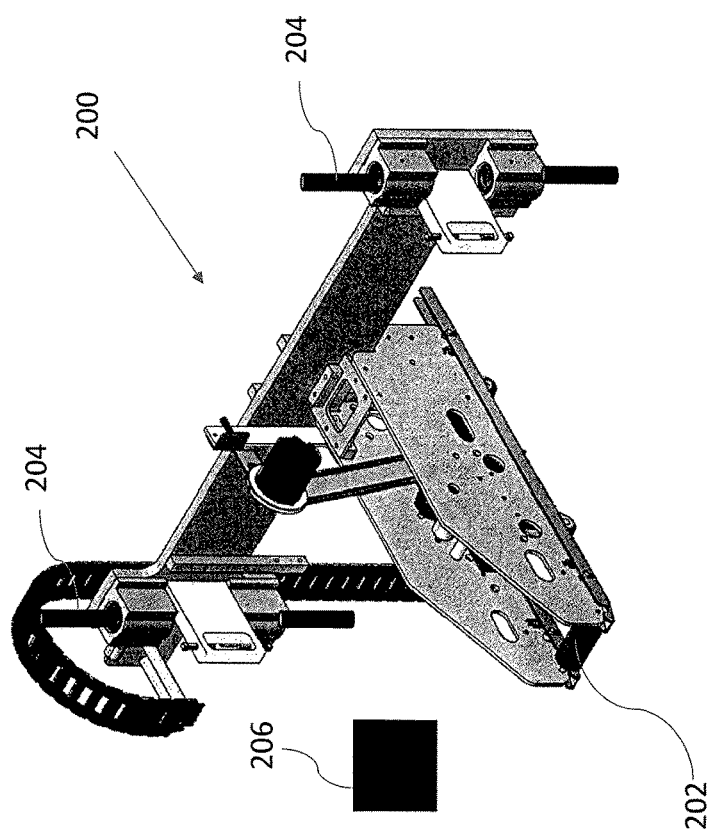
Figure 8:
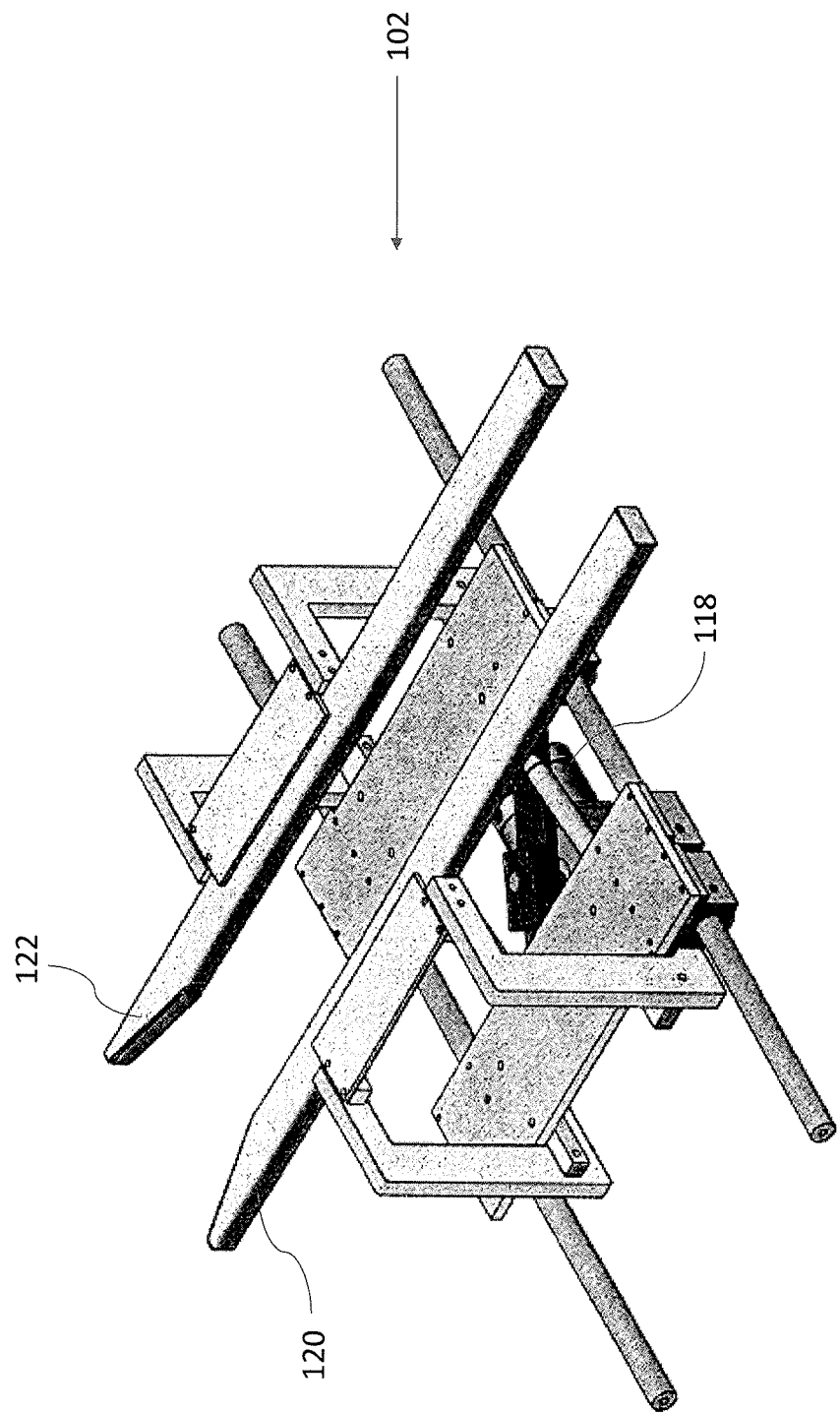
FIG. 8 is a perspective view of a case centering system.

Referring now to the drawings in which like reference numerals refer to like parts throughout, there is seen in FIG. 1 a packaging machine, designated generally by reference numeral 10, for closing and sealing boxes/packages containing predetermined quantities of product such that they may be shipped to a further destination. Packaging machine 10 generally comprises a pre-measurement section 12, a tuck-and-fold section 100 where the flaps of the packages are tucked/folded from an open to a closed position, and a sealing section 200 that seals the package in its closed position with tape or other adhesive. Further, packaging machine 10 comprises a user/human interface 300 that permits a human operator of machine 10 to input package parameters and other data relating to the running of the machine, and a control system 400 in which a microcontroller is housed and which contains the computer programs and data that control the electro-mechanical equipment running machine 10. Finally, a conveyor system 500 is disposed amongst a plurality of rollers 502 to advance packages along the machine 10 for purposes of being processed accordingly. It should be noted that pre-measurement section 12 is an optional portion of machine 10, and that if not used, a measurement device 14 is incorporated into machine 10 is advance of tuck-and-fold section 100 to perform the measurement needs for the operation of machine 10.

In regard to tuck-and-fold section 100, it generally comprises a case centering system 102 and side flap tuck arms 104/106 and front and rear flap arms 108/110 (that are part of a single arm assembly that pivots at about its mid-point to engage and tuck the front and rear flaps). Servo-motor 112 drives the vertical positioning of the arms 104-110 along a pair of guide rods 114, 116, based upon the height parameter of the package being processed. In the traditional packaging machines, this is done by entry of the height parameter into the human interface 300 which then drives the motor to adjust to the appropriate height based on that input. The centering system 102 includes a pneumatic or other actuator 118 that pushes centering arms 120, 122 towards or away from one another based upon the width dimension of the packages being processed. The arms 120, 122 apply sufficient pressure on the sides of the package to maintain them in position while the flaps are closed. These aspects of machine 10 are conventional.

In regard to the sealing section 200 it includes a top tape applying device 202 that is vertically adjustable along rails 204 to which the top device 202 is slidably mounted. A motor 206 drives the top tape applying device 202 up or down the rails 204 to the height that permits the tape to be applied across the top of the package and in sealing relation to its flaps. A bottom tape applying device 208 applies tape to the bottom seam of a package. This sealing section 200 is conventional with regard to machine 10.

Conveyor system 500 includes a pair of tracks 504, 506 that are independently driven by motors. This too is a common feature of packaging machines.

When packages are loaded onto machine 10, they can be measured in premeasurement section 12 or measurement device 14. Various parameters of each package loaded on machine 10 can be measured, including the height, width, depth, and weight of each package. These parameters can then be electronically transmitted to the microcontroller 402 in control center 400 or manually input via human interface 300. Within control center is a computer program and a look-up table/database 406 stored in the memory 408 of the control center 300. The look-up table/database 406 contains data that correlates package size parameters with conveyor optimal speed, tuck and flap section height, centering system pressure, and sealing section height. The computer program receives the package parameter data, queries the look-up table/database 406 with this data, receives the optimal speed, tuck and flap section height data, centering system pressure data, and sealing section height data in return, and then transmits that data to the various motors that control these aspects of machine 10, causing the machine 10 to run at these optimal settings for each package that is processed through machine 10 without having manual intervention, nor a machine that is simply set to run at the slowest rate of speed for a given set of package types.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A packaging machine for closing and sealing packages having size parameters, comprising:
   a. a conveyor driven by a motor and on which packages are placed for movement through the machine;
   b. a measurement device configured to determine the size parameters of the packages;
   c. a tuck-and-fold section adapted to close the packages;
   d. a centering system adapted to engage and center each package for closing and sealing;
   e. a sealing system for sealing each package closed; and
   f. a control center in communication with the measurement device, comprising:
      i. a microcontroller;
      ii. a non-transitory memory
      iii. a database having data stored therein that correlates each package's size parameters with an optimal speed at which the conveyor can be driven and an optimal pressure to be applied to the packages by said centering system; and
      iv. a computer program stored in said non-transitory memory and having computer readable instructions that receive each package's size parameter, queries said database to look-up the optimal speed and pressure profile based on the package's size parameters, sends a signal to said motor driving said conveyor to cause said conveyor to move according to the optimal speed profile and sends a signal to said centering system to cause said centering system to apply a pressure to said packages according to the optimal pressure profile, without manual intervention.

2. A computer program product for use with a packaging machine for closing and sealing packages having size parameters a conveyor driven by a motor and on which packages are placed for movement through the machine; a measurement device; a tuck-and-fold section adapted to close the packages; a centering system adapted to engage and center each package for closing and sealing; a sealing system for sealing each package closed; and a database stored in non-transitory memory and having data stored therein that correlates each package's size parameters with an optimal speed at which the conveyor can be driven and an optimal pressure to be applied to said packages by the centering system, said computer program product being executable on a processor and containing program instructions that receive each package's size parameter, queries said database to look-up the optimal speed and pressure profile based on the package's size parameters, sends a signal to said motor driving said conveyor to cause said conveyor to move according to the optimal speed profile and sends a signal to said centering system to cause said centering system to apply a pressure to said packages according to the optimal pressure profile without manual intervention.

3. A method for product for use with a packaging machine for closing and sealing packages having size parameters a conveyor driven by a motor and on which packages are placed for movement through the machine; a measurement device configured to determine the size parameters of the packages; a tuck-and-fold section adapted to close the packages; a centering system adapted to engage and center each package for closing and sealing; a sealing system for sealing each package closed; and a database stored in non-transitory memory and having data stored therein that correlates each package's size parameters with an optimal speed at which the conveyor can be driven, said method comprising the steps of:
   a. receiving each package's size parameter from the measurement device in a microcontroller;
   b. querying the database to look-up the optimal speed and pressure profile based on the package's size parameters; and c. sending a signal to said motor driving said conveyor to cause said conveyor to move according to the optimal speed profile without manual intervention.

\* \* \* \* \*